United States Patent [19]
Scheuchzer et al.

[11] Patent Number: 5,992,329
[45] Date of Patent: Nov. 30, 1999

[54] MACHINE FOR WELDING AT LEAST ONE RUN OF RAIL

[75] Inventors: Antoine Scheuchzer, Epalinges; Gérard Schelling, La Conversion; Christian Wenger, Bussigny-Pres-Lausanne; Jean-Jacques Aubert, Morges, all of Switzerland

[73] Assignee: Scheuchzer, S.A., Switzerland

[21] Appl. No.: 08/948,838

[22] Filed: Oct. 10, 1997

[30] Foreign Application Priority Data

Oct. 11, 1996 [EP] European Pat. Off. .............. 96810684

[51] Int. Cl.⁶ .................................................. E01B 31/00
[52] U.S. Cl. ............................................................ 104/15
[58] Field of Search ................... 104/2, 7.1, 7.2, 104/15; 219/53, 54

[56] References Cited

U.S. PATENT DOCUMENTS

| | | | |
|---|---|---|---|
| 3,726,232 | 4/1973 | Bryan | 104/15 |
| 4,236,453 | 12/1980 | Collen | 104/15 |
| 4,272,664 | 6/1981 | Theurer | 104/15 |
| 5,099,097 | 3/1992 | Theurer | 219/53 |
| 5,195,436 | 3/1993 | Valditerra | 104/15 |

FOREIGN PATENT DOCUMENTS

| | | |
|---|---|---|
| 0 326 794 A1 | 8/1989 | European Pat. Off. . |
| 0 466 651 A1 | 1/1992 | European Pat. Off. . |
| 44 45 052 A1 | 6/1996 | Germany . |
| 2 159 449 | 12/1985 | United Kingdom . |

*Primary Examiner*—Mark T. Le
*Attorney, Agent, or Firm*—Skjerven, Morrill, MacPherson, Franklin & Friel LLP

[57] ABSTRACT

A machine for welding rail comprises a rail vehicle with at least one energy generator set, a programmable automatic control unit and a raised chassis disposed between the bogies of the vehicle. The chassis supports at least one welding unit, grinders, two workbench units, each comprising a beam equipped with grippers for gripping, lifting and holding the rails in a working position, a set of grippers at the ends of the vehicle, and position sensors.

9 Claims, 8 Drawing Sheets

MACHINE FOR WELDING AT LEAST ONE RUN OF RAIL

FIELD OF THE INVENTION

The present invention relates to a method for welding at least one stretch of new railroad rails to be substituted for the old rails, already deposited on the track, by means of a machine that runs along the old rails and equipped in particular with equipment for flash-forge welding, with means for grinding and means for gripping and guiding the new rails.

When laying a new railroad track or when renewing an existing track, rail sections are welded together to form continuous stretches of rails.

The length of the rail sections used varies from one country to another. In Switzerland, for example, these sections are 108 meters long. These sections are welded together using various methods and machines, all having advantages in some situations and disadvantages in others. Thus in countries where labor costs are low, preference is given to less automated methods and machines, while in countries where labor costs are high, preference is given to more automated methods and machines.

One of the major concerns in reconditioning work is that of achieving the highest possible rate of progress of work without detracting from the quality of the work carried out so as to reduce the cost of the work undertaken on the one hand, and keep the track free for commercial traffic on the other hand. Often, when the work is maintenance or renewal work, this work is carried out during the night when there is less or even no commercial traffic on the railroad track.

As the welding and finishing work, namely the debarring and grinding of the weld joint constitute precision work which takes a relatively long time to carry out, it has been proposed that two bars of rail be welded together and all the finishing work completed away from the railroad track site, for example in a workshop, and that the rail sections twice as long as sections habitually used be transported to the site, which halves the amount of welding and finishing work that needs to be carried out on site. This method does however have a major drawback—transporting long rails requires very long cars. Furthermore, these long bars are not easy to handle and experience deformation which will have to be corrected later.

Various devices for pulling the rails and bringing the ends to be welded face to face have also been developed.

PRIOR ART

Patent application EP 0 597 736 proposes a flash welding method. This method attempts, in particular, to eliminate the stresses to which the rails are subjected when a machine weighing several tons presses down on them during the welding work, thus causing deformation which will have to be corrected. In this method, the rails are laid on the crossties and fixed down by coach bolts over a certain length. When such a track is reconditioned, the coach bolts upstream of the welding point are loosened over a length of between 10 and 40 meters; the coach bolts downstream are loosened over the entire length of the rail section. Welding is then carried out using a machine resting not on the rails but on the ground. In this way, during the welding work and the beginning of cooling, the rails are not subjected to stresses that are due to the weight of the machine. The partial freeing of one of the rail sections and the complete freeing of the other rail section furthermore allows the latter to slide freely during welding and avoids the two sections being subjected to stresses close to the welding joint, which stresses could cause permanent deformation which would have to be corrected later. After the welding work, the coach bolts are put back in place and work moves on to the next weld joints. This method does in effect allow welding to be carried out under good conditions but the handling required in laying the rails, loosening the coach bolts to allow welding, refitting coach bolts to fix the rails down and the derailment and entailment of the machine are relatively cumbersome and lengthy operations. Furthermore, this document does not mention the work of grinding the weld joint.

Described in patent FR 2 719 608 is a method of flash welding using a welding machine suspended in cantilever fashion from an arm which hangs out over the rails during the welding operation. The coach bolts are loosened beforehand on either side of the welding point and the rails are free at the end downstream of this point. To keep the rails straight and even, two auxiliary carriages running along the track and equipped with suitable means are also used on each side of the welding point. Furthermore, to avoid the track being subject to the weight of these carriages, additional resting devices allowing the carriages to rest on the ballast or on the crossties are used. In this case too, the coach bolts need first of all to be loosened so that the operation of welding the rails can be carried out, and then screwed in again in order to fix down the welded rails. Furthermore, no grinding operation is scheduled.

In patent EP 0 466 651, the Applicant Company described a train for substituting railroad track rails which run both on the old and on the new track, this train comprising among other things a welding vehicle equipped with a welding unit for welding the adjacent ends of the new rails so as to form continuous runs of rails, and a vehicle heating up the rails in order to neutralize them, that is to say in order to lay and fix the rail in a condition of less expansion corresponding to an average temperature of approximately 25° C. This operation makes it possible to reduce the risk of the rails breaking in cold weather or deforming when weather is extremely hot. The new rails are deposited beforehand in the middle of the track between the old rails and experience the welding and neutralizing work before being laid down in place of the old rails by a track-laying vehicle.

SUMMARY OF THE INVENTION

The present invention provides a rail-mobile machine for rapidly joining sections of rail together by welding them end-to-end, and for grinding the weld joints made before the welded stretch of rails passes into a neutralizing vehicle, such as the one described in the aforementioned patent.

The machine according to the invention comprises the following apparatus:

gripping means for gripping and lifting the ends of two consecutive rails of a run into a working position, and for supporting the two rails in a straight line extending for at least the length of the machine, welding equipment, moveable between a standby position and a working position for welding two rail ends of said run together by flash-forge welding while allowing the rail on either side of the weld to freely expand and contract longitudinally during the welding, first grinding means, moveable between a standby position and a position for working on a welded joint for grinding the underside of the rail in the region of the weld to remove the weld bead, second grinding means moveable between a standby position and a position for working on the welded joint for grinding the running surface and the running sides of the rail head in the region of the weld.

One of the essential advantages of this method is the fact that the rails are kept in a straight line during both the welding and the grinding operations. Their deformation, which would require correction to straighten it, is thus prevented. Another advantage is that the operations of grinding the underside of the rail bottom and of the rail head are carried out just after the welding operation, while the rails are still being held in a straight line, and this avoids additional handling.

This method in particular allows the joints of two stretches of rails to be welded in succession. Thus while the rail ends of the second stretch are being welded, the underside of the rail bottom of the first stretch can be ground in the region of the weld, and while the underside of the rail bottom of the second stretch is being ground in the region of the weld, the rail head of the first stretch of rails can be ground in the region of the weld. Carrying out operations in parallel in this way on the two stretches makes the proposed method quicker.

In addition, in the proposed method, no preliminary work of laying and unlaying the rails is required because the rails are free and placed in the middle of the track, the machine for its part running on the old rails. When the new stretch of rail is put back down in the middle of the track after welding and grinding, no deformation due to this work remains because the rails were not subject to any loading other than that of the forging applied by the welding equipment. Permanently holding the two rails on either side of the weld during the welding, possible cooling and grinding operations avoids any deformation, which might be caused by these operations if the rails were released immediately after welding, from appearing.

Furthermore, the two ends are welded together with the two rail sections held in a straight line at least over the length of the vehicle, even when the vehicle is on a curve in the track. In this way, after welding, a continuous rail is obtained that is free of the deformation and stresses due to the fact that welding took place in a curve in the track. The definitive shape of the rail will be given at the time of laying, without the weld joint being something to which particular attention needs to be paid. Thus using this method, the obligation of having to position the weld in the rails between two crossties or alternatively, the obligation of transversely aligning welds in the left-hand stretch with those in the right-hand stretch of rails disappears.

This method further makes it possible to carry out a special and optional step which consists in an accelerated cooling of the rail head prior to the grinding operation, this corresponding to quenching the rail head. To carry out this cooling step, use may be made of jets of air.

According to a preferred embodiment, the rails are deposited on roller-type supports arranged in the middle of the track, these rollers making it easier for the rails to slide longitudinally during the various items of work and therefore avoiding stresses created by the expansion of the rails. These roller-type supports are arranged on the track before the vehicle for welding and grinding passes, and they are collected up again afterwards by the vehicle that neutralizes the rails.

The method according to the invention may also be automatically controlled. In this case, an orthogonal reference base XYZ is first of all defined on the machine and the position of the moving means as well as their displacements are continuously measured and calculated within this orthogonal base. The displacements of the gripping means, of the welding equipment and of the grinding means then take place as follows within the orthogonal base:

the rails are brought into the working position and put back down on the track by displacements of the gripping means in the Y and Z directions, the welding equipment is positioned precisely over the joint to be welded of the first stretch, over the joint to be welded of the second stretch and returned to its standby position by displacements in the X, Y and Z directions, the first grinding means for grinding the underside of the rail bottom of the first stretch is positioned over the welded joint by displacements in the Y and Z directions, and grinding takes place by reciprocating movements of the grinding wheel in the Y direction, the first grinding means is returned to the standby position by displacements in the Y and Z directions, the second grinding means for grinding the rail head is positioned precisely over the welded joint of the first stretch and over the welded joint of the second stretch by displacements in the X, Y and Z directions, the rail head of the first stretch and of the second stretch is ground by controlled reciprocating movements of the grinding wheel in the X and Z directions and by rotating the second grinding means about an axis parallel to the X-axis, the second grinding means is returned to the standby position by displacements in the X, Y and Z directions, the third grinding means for grinding the underside of the rail bottom of the second stretch is positioned over the welded joint by displacements in the Y and Z directions, and grinding takes place by reciprocating movements of the grinding wheel in the Y direction, the third grinding means is returned to the standby position by displacements in the Y and Z directions.

In the case of a method managed by an automatic control unit, this control unit is programmable into the following steps needed for implementing the method:

a) after the gripping means have gripped the rails, they are brought into the working position by the displacements of the gripping means in the Y and Z directions, b) the welding equipment is positioned precisely over the joint to be welded of the first stretch by the displacements in the X, Y and Z directions, c) the first stretch is welded, d) the welding equipment is positioned precisely over the joint to be welded of the second stretch by the displacements in the X, Y and Z directions, then the second stretch is welded at the same time as the first grinding means for grinding the underside of the rail bottom of the first stretch is positioned over the welded joint by the displacements in the Y and Z directions, and grinding is carried out by reciprocating movements of the grinding wheel in the Y direction, e) the first grinding means is brought into the standby position by the displacements in the Y and Z directions as soon as the operation of grinding the underside of the rail bottom of the first stretch is over, f) the welding equipment is brought into its standby position by the displacements in the X, Y and Z directions, at the same time as the third grinding means for grinding the underside of the rail bottom of the second stretch is positioned over the welded joint by the displacements in the Y and Z directions, and grinding is carried out by the reciprocating movements of the grinding wheel in the Y direction, as the second grinding means for grinding the rail head is positioned precisely over the welded joint of the first stretch by the displacements in the X, Y and Z directions, and as the rail head is ground by the controlled reciprocating movements of the grinding wheel in the X and Z directions and by rotating the grinding wheel about an axis parallel to the X-axis, g) the third grinding means is returned to the standby position by the displacements in the Y and Z directions as soon as the operation of grinding the underside of the rail bottom of the second stretch is over, h) the second grinding means for grinding the rail head is positioned precisely over the welded joint of the second stretch by the displacements in the X, Y and Z directions, and as the rail head is ground by the controlled reciprocating movements of the grinding wheel in the X and Z directions as well as by rotating the grinding wheel about an axis parallel to the Xaxis, i) the second grinding means is returned to its standby position by the displacements in the X, Y and Z directions as soon as the operation of grinding the rail head of the second stretch is over, j) the rails are put back down on the track by the displacements of the gripping means in the Y and Z directions, then the rails are released by opening these gripping means.

This automatic control makes it possible, as may be seen, for several items of work to be carried out in parallel on the two stretches of rails, the end result of this being that a complete cycle takes less time.

BRIEF DESCRIPTION OF THE DRAWINGS

The appended drawings depict, by way of example, a machine for implementing the method according to the invention.

DESCRIPTION OF THE PREFERRED EMBODIMENT(S)

Figure 1:
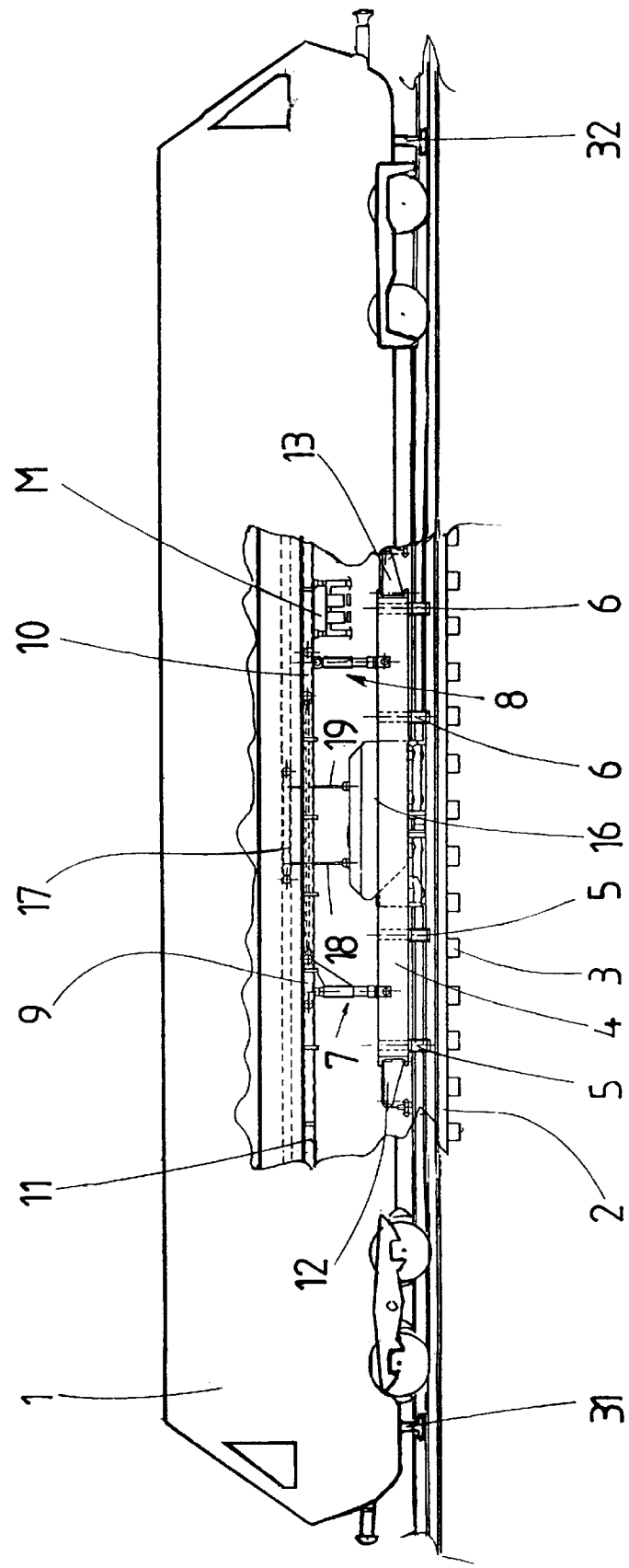
FIG. 1 is a schematic view of the vehicle.
Figure 2:
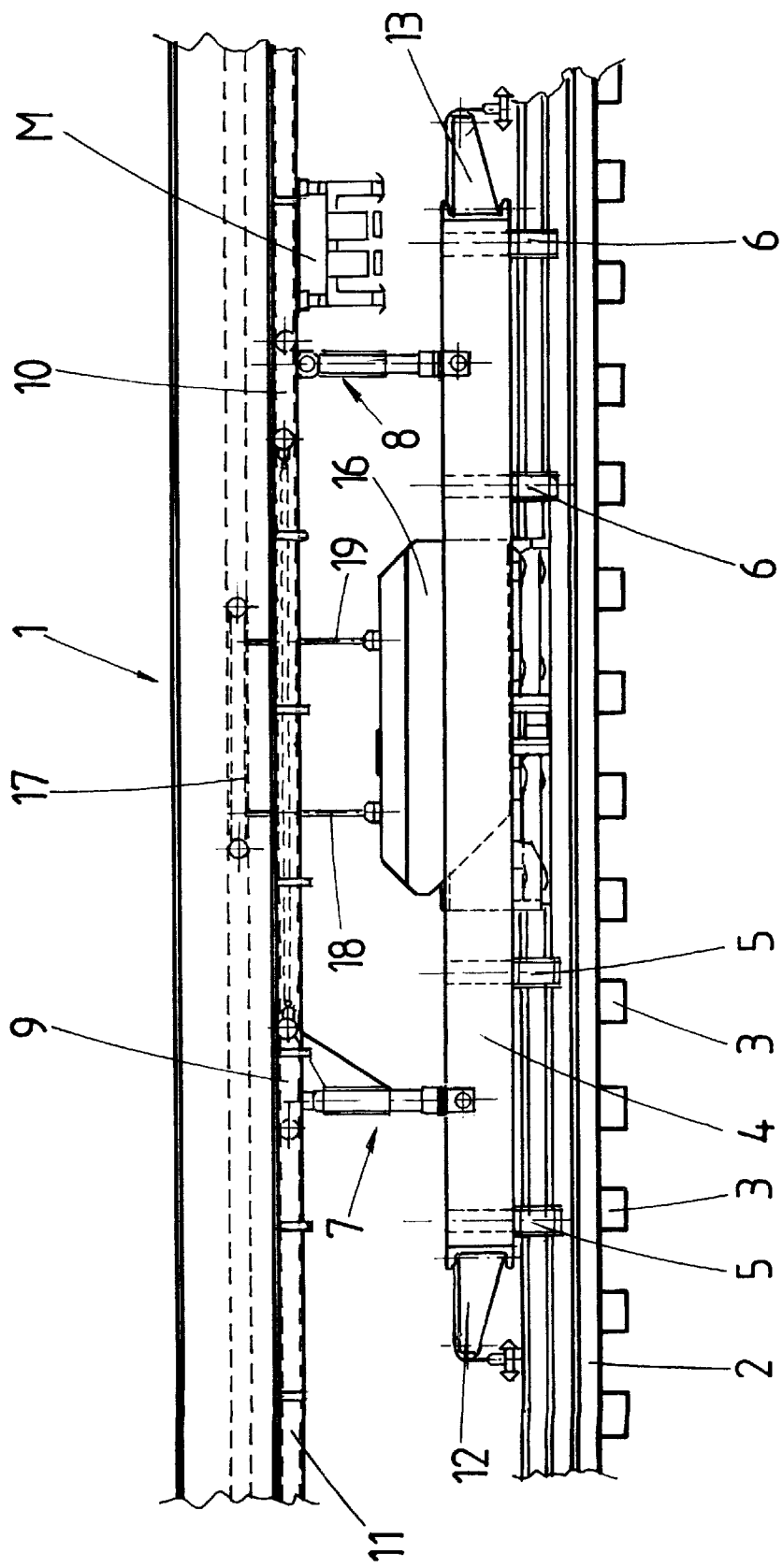
FIG. 2 is a partial side view of the welding vehicle showing the essential parts of this vehicle.

A welding machine mounted in a vehicle is depicted in FIGS. 1 and 2. The vehicle 1 comprises two bogies, one at the front and one at the rear, and runs along a railroad track comprising rails 2 and 2' (not depicted) and crossties 3. The vehicle 1 is furthermore equipped with a workbench comprising a beam 4 supporting two front grippers 5 and two rear grippers 6 for gripping the rails to be assembled and ground which are suspended from the chassis of the vehicle 1 for each stretch of rails. The beam 4 of the workbench is suspended by two vertical-displacement pins 7, 8, one at the front and the other at the rear, and these pins are secured respectively to a front carriage 9 and to a rear carriage 10 that run along rollers in runways 11 of the chassis to provide longitudinal displacement of the workbench. The two pins 7 and 8 are advantageously fitted with two hydraulic actuators which provide the vertical displacement of the workbench and that of the grippers and of the rails which are held by said grippers. At both ends of each workbench, devices in the form of cranes 12 and 13 are provided for gripping the prefabricated insulating joints inserted between the sections of welded rail, as will be explained later. The construction of the workbenches and especially that of the means for providing displacement in the three directions may be different than in the foregoing description.

In FIG. 1, grippers 31 and 32 for gripping the rails are also depicted at the front and rear of the vehicle 1.

In these FIGS. 1 and 2, grinding equipment M that can be displaced in three directions is depicted diagrammatically along with the welding equipment 16, the carriage 17 from which the welding equipment 16 is suspended by two pins 18 and 19.

Figure 3:
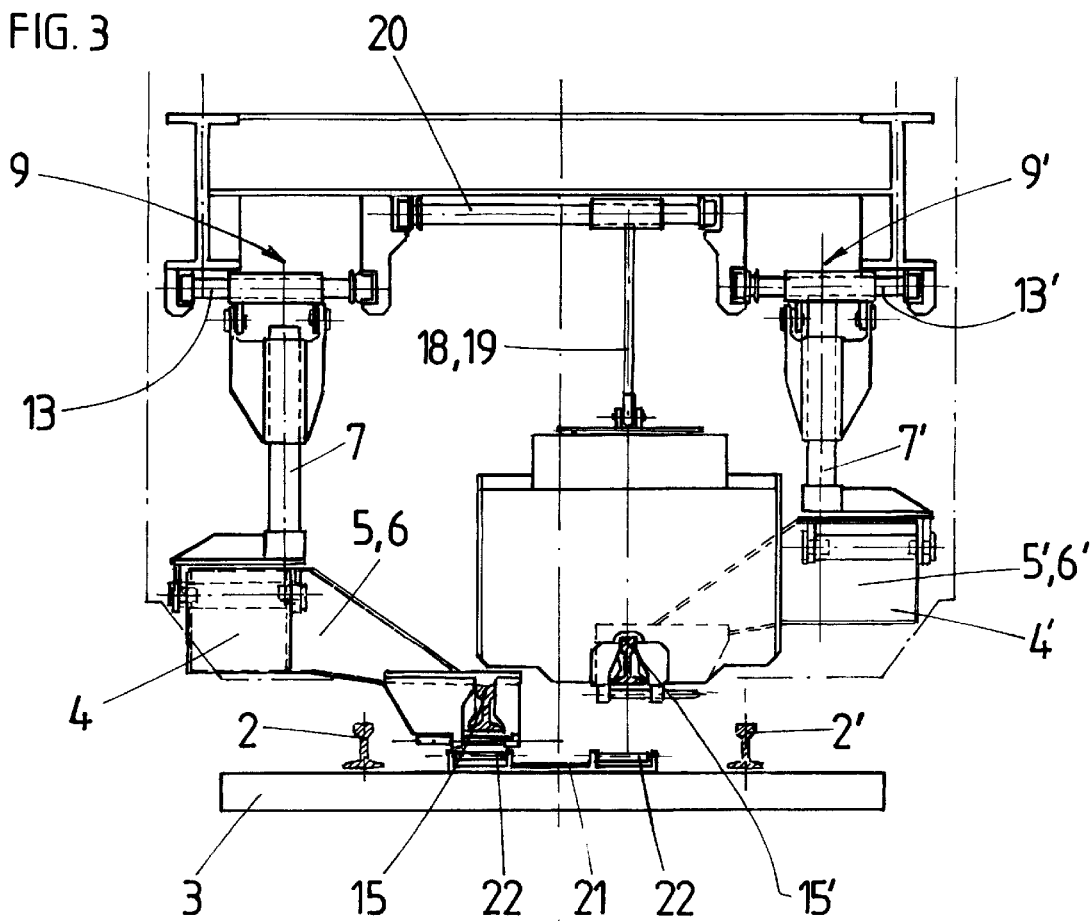
FIG. 3 is a sectional view through the welding head.

Depicted in detail and with references in FIG. 3 are two workbenches. Thus it is possible to see the pins 13 and 13' of two beams 4 and 4', these beams allowing the transverse displacement of each workbench for positioning the rails 15 and 15' to be welded. Said pins 13 and 13' form part of the front carriages 9 and 9' of each beam 4, 4' and similar devices are provided for the rear carriages 10 and 10' (not depicted). Transverse displacement of the beams 4 and 4' is obtained by a hydraulic or pneumatic actuator or any other similar system. Likewise, the welding equipment 16 is suspended from a carriage 17 by two pins 18 and 19. The carriage 17 allows longitudinal displacement of the welding equipment 16, while the pins 20 allow transverse displacement of the welding equipment 16 on the one hand so that it can be positioned with respect to the stretch of rails to be welded and, on the other hand, so that it can change from one stretch of rails to the other. Here too, displacement of the welding equipment in the transverse direction is obtained by hydraulic or pneumatic actuators, or alternatively by other equivalent means.

It is also possible to make out in FIG. 3 on the crosstie 3, a roller-type support 21 equipped with two rollers 22 on which the rails to be welded rest, this allowing the rails subjected to expansion during welding or to shrinkage during cooling to slide longitudinally. These rollers also make the rails easier to displace. Furthermore, the welding equipment 16 is depicted in position for carrying out welding on the second stretch of rails 15' held by the grippers 5' and 6', while the front grippers 5 and the rear grippers 6 of the workbench are holding the rail 15 of the first stretch in standby awaiting the grinding work.

Figure 4:
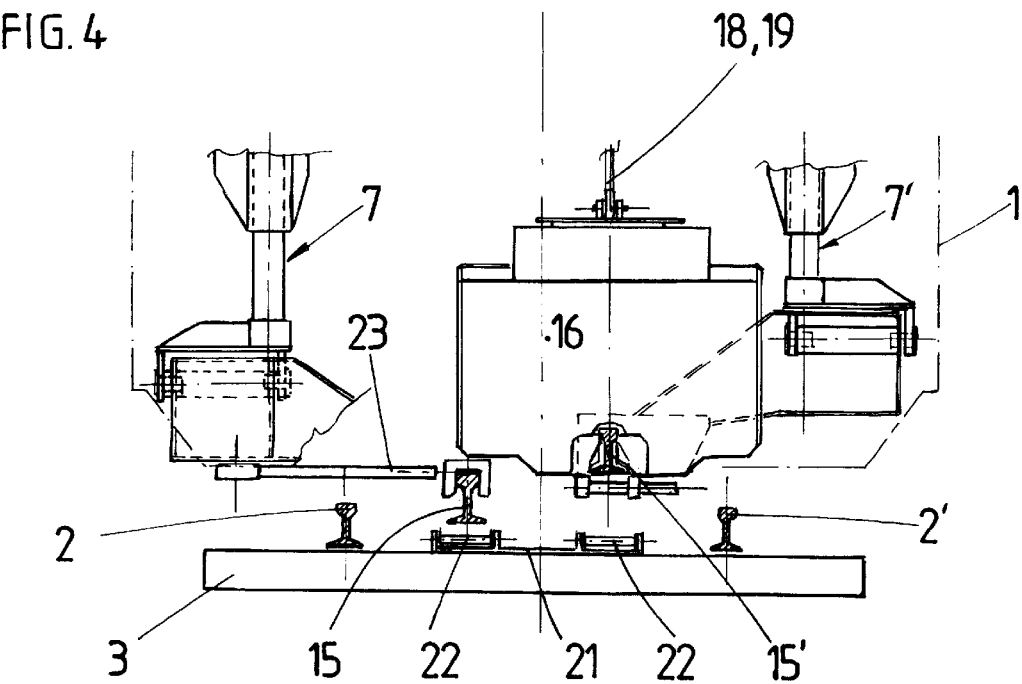
FIG. 4 is a view similar to the previous one, in which the welding equipment is carrying out welding on the second stretch of rails while accelerated cooling is being applied to the first weld.

In FIG. 4, the situation depicted is the same in the sense that the welding equipment 16 is positioned over the second stretch of rails 15'. By contrast, the rail 15 of the first stretch is cooled by a cooling device 23 before the underside of the rail bottom 15 is ground. The cooling device 23 may be organized to cool the rail head using jets of air, the purpose being to quench the steel by reducing the temperature from 800° C. to 500° C. in 1 minute.

Components that are important in implementing the method are the four grippers 5, 5', 6, 6' of each workbench.

Figure 5:
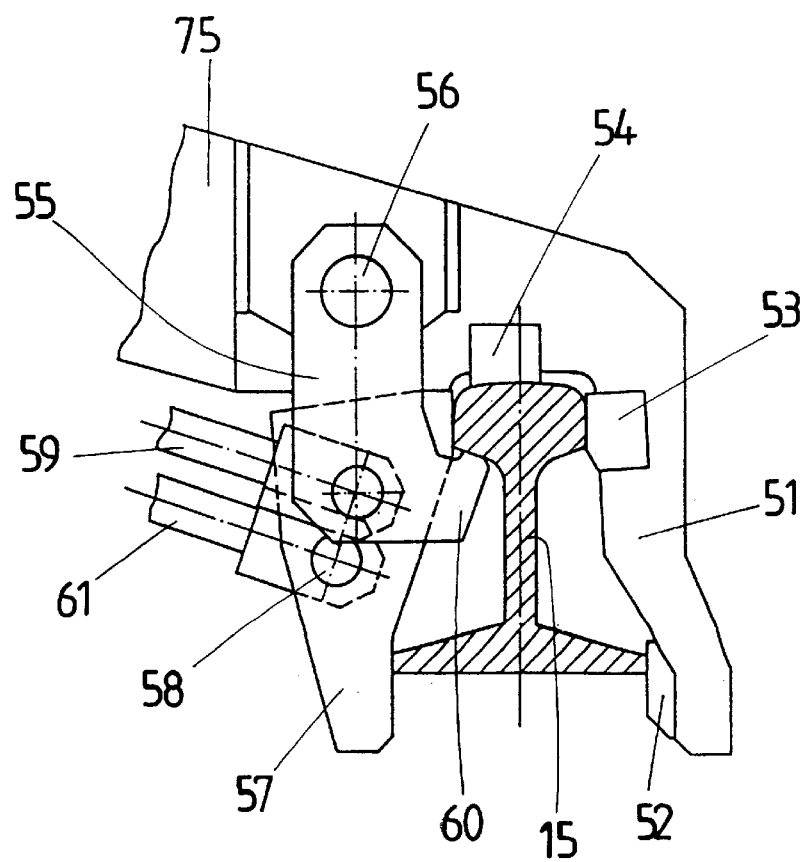
FIG. 5 is a front-on view of a work bench gripper.

One of these grippers is depicted in FIG. 5. It consists of a fixed jaw 51 secured to an arm 75 fixed to the beam 4 of the workbench. The jaw 51 comprises three reference stops 54, 53, and 52 matched to the profile of rail 15 to be gripped and making it possible to ensure that the ends of the rails are perfectly aligned. These three stops are preferably removable so that they can be matched to each rail profile. The moving jaw of the gripper consists of a first lever 55 articulated to a first horizontal fixed pivot 56, a shoe 57 suspended from a second horizontal pivot 58, a second lever articulated at one end to the first horizontal fixed pivot 56 and at the other end to the second horizontal pivot 58. The first lever is operated by a first actuator 59 and is organized so that it grips, positions and holds the rail head in the gripper in the vertical sense, while the free end of the second lever is articulated to the shoe 57, is operated by a second actuator 61 in synchronism with the first actuator 59 and is likewise organized to grip, position and hold the rail in the gripper in the transverse sense.

Figure 6:
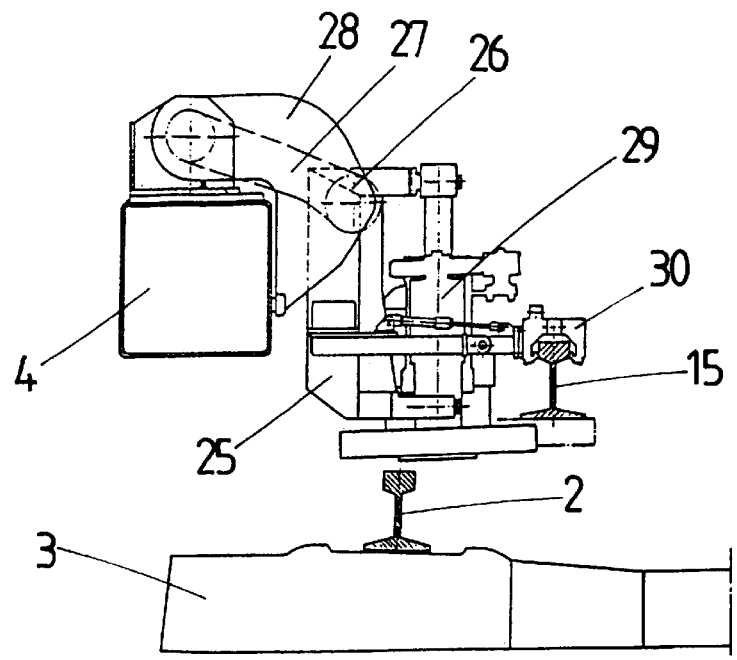
FIG. 6 is a front-on view of a means for grinding the underside of the rail bottom.
Figure 7:
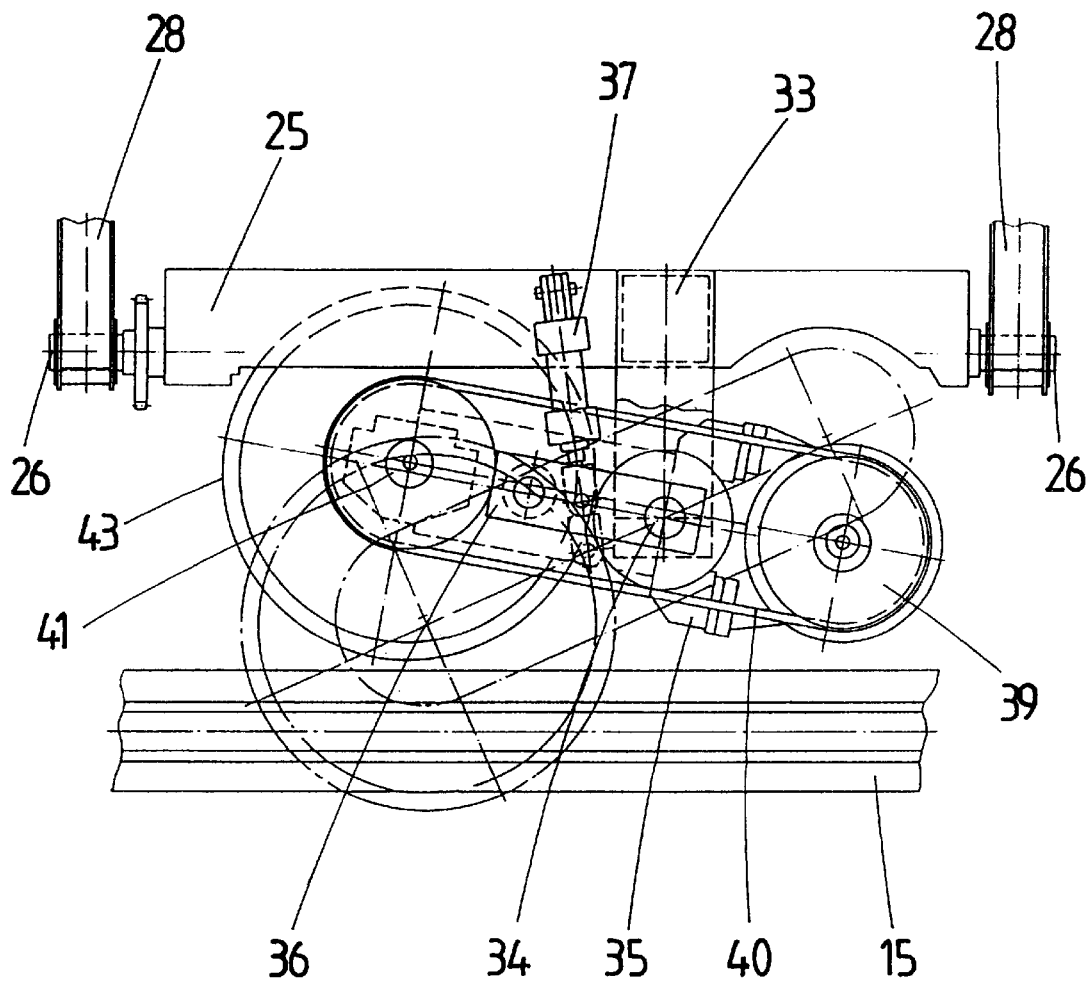
FIG. 7 is a view from above of the means for grinding the rail bottom.
Figure 8:
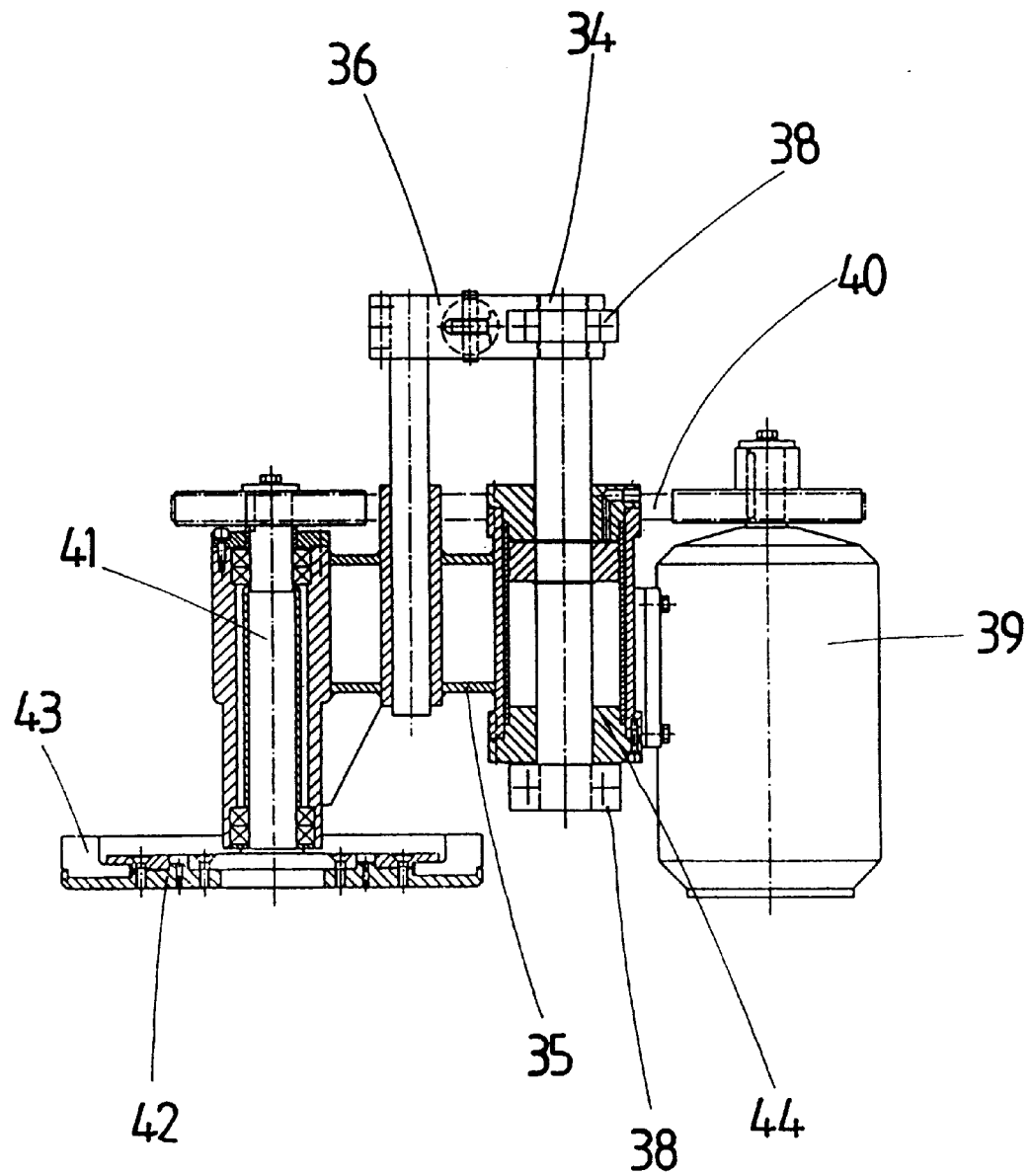
FIG. 8 is a view in axial section of the means of grinding the underside of the rail bottom.

The means for grinding the underside of the rail bottom is described in detail with reference to FIGS. 6 to 8.

This grinding means comprises a chassis 25 mounted in guide slots 27 of two support arms 28 via two journals 26, the support arms 28 being articulated by one end to the beam 4. A piston, not depicted, allows the chassis 25 to be pushed into its working position depicted in FIG. 6 or allows it to be returned to a position of rest, which is a position offset by 90° in the counterclockwise direction from the working position. The chassis 25 supports, on the one hand, a grinding head 29 for grinding the underside of the rail bottom 15, and on the other hand, a device for cooling the rail 15 with jets of air similar to the one in FIG. 4. Thus as soon as the welding of the ends of the rails is over, the chassis 25 is tilted so that either the accelerated cooling of the rail head and the grinding of the underside of the rail bottom can be carried out or so that just grinding can be carried out. A device of this kind is mounted symmetrically on the beam 4' so that the same operations can be carried out on the second run of rail 15'.

Mounted on the chassis 25 are a support 33 carrying a pivoting frame 35 via a lateral pivoting bearing 38 and a lateral pivot pin 34, means, such as a lever 36 and an actuator 37 for controlling the lateral pivoting of the frame, for making the pivoting frame 35 pivot laterally about the pivot pin 34 in the XY plane, and an actuator 44 for causing a vertical sliding of the pivoting frame parallel to the vertical axis Z. This actuator 44 furthermore allows the grinding wheel to be brought into contact with the rail bottom with a well determined force.

The pivoting frame 35 supports, for its part, a grinding wheel 43 driven in rotation by a motor 39 via a transmission belt 40 driving the arbor 41 of the grinding wheel and the grinding wheel carrier plate 42 on which the grinding wheel 43 is fixed.

The rail bottom is ground in the steps described above.

Figure 9:
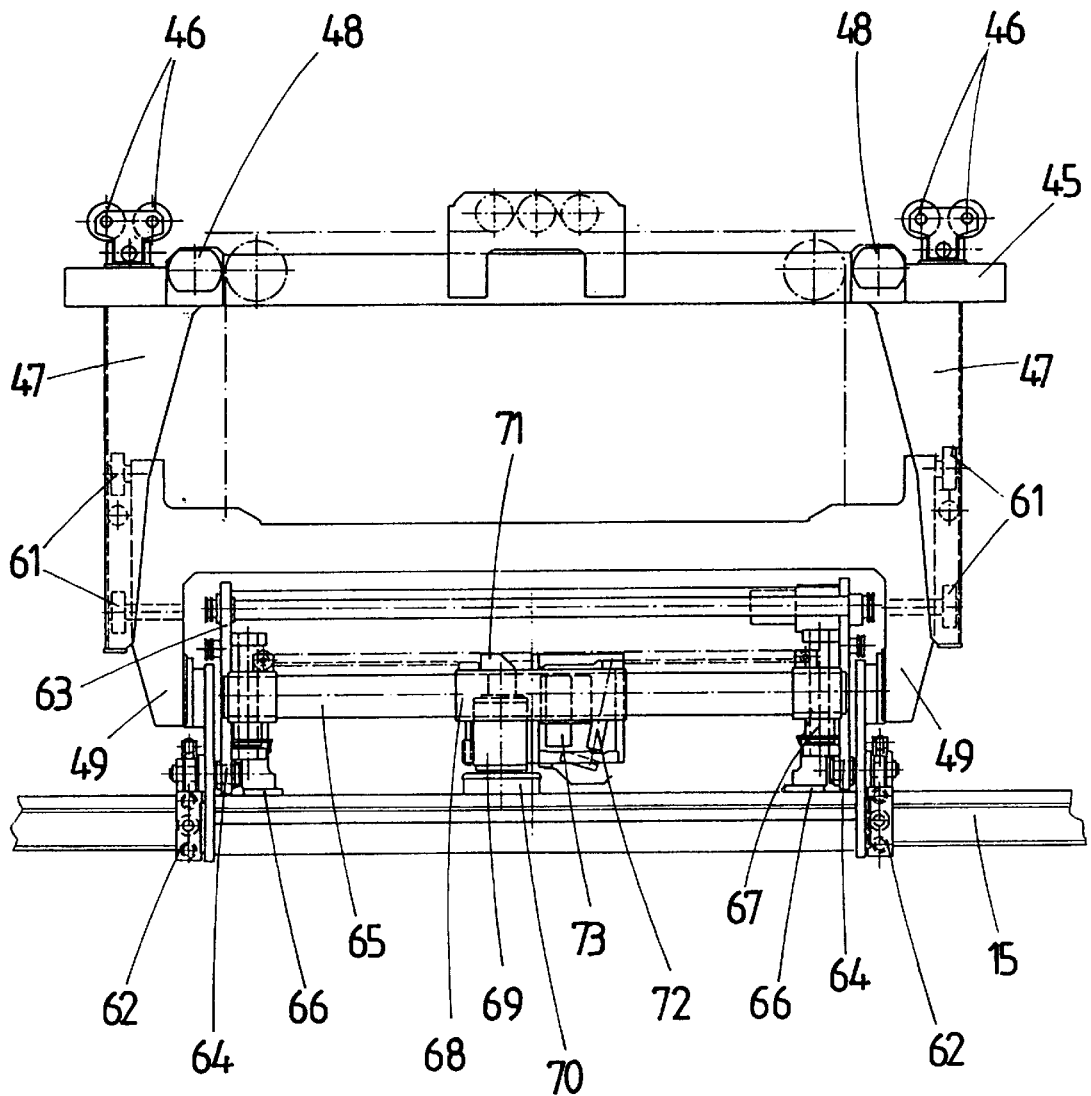
FIG. 9 is a side view of the means for grinding the rail head.
Figure 10:
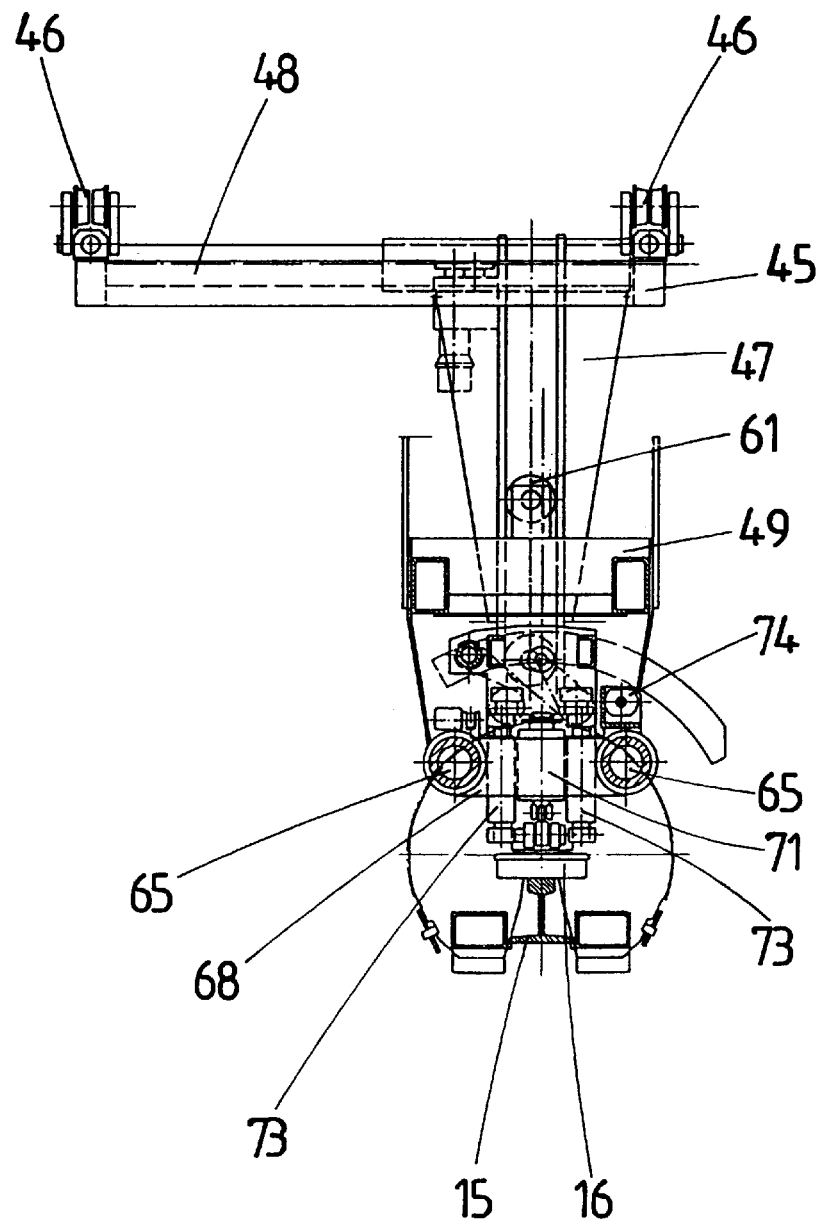
FIG. 10 is a front-on view of the means for grinding the rail head.

The means for grinding the rail head is described with reference to FIGS. 9 and 10. This second grinding means in particular comprises a support carriage 45 mounted on the chassis via suspension rollers 46 allowing it to be displaced longitudinally parallel to the X-axis with respect to the chassis, a first frame 47 sliding transversely parallel to the Y-axis on transverse guidance tubes 48 fixed to the support carriage 45, a second frame 49 sliding vertically parallel to the Z-axis with respect to the first frame 47 on vertical guidance rollers 61, clamps 62 for clamping the second frame 49 on the welded rail 15, and a third frame 63 pivoting about a pivot pin 64 parallel to the X-axis making it possible to change the angle of grinding of the rail head. The third frame 63 supports a grinding head 68 via longitudinal guidance tubes 65 parallel to the X-axis, runners 66 for resting on the rail for the longitudinal guidance tubes 65, vertical guidance pins 67 and longitudinal guidance tubes 65. The third frame 63 furthermore supports an actuator 72 for controlling the height of the grinding wheel 70 in the grinding head 68 and vertical guidance 73 of the grinding wheel, and an actuator 74 for controlling the longitudinal movement of the grinding head 68.

The grinding head 68 for its part comprises the grinding wheel 70 driven by a motor 71 via an arbor 69.

As the frame 63 is mounted so that it can pivot about the pin 64, as soon as grinding at a certain angle is over, the grinding wheel can be positioned at some other angle by rotating the frame 63 and a succession of grinding angles for the rail head may be selected or programmed.

The rail head is ground in the steps described above.

To implement an entirely automatic method, the machine comprises a control unit, transmission means, such as cables, and position sensors that continuously determine the positions of the welding unit 16, of the grinding means, of the workbench units, of the gripping means and of the grippers in the orthogonal reference base XYZ of the machine. This control unit therefore makes it possible to determine the commands for displacing the welding unit, the grinding means, the workbench units, the gripping means and the grippers necessary for implementing the method, and the transmission means for their part allow the values detected by the sensors to be transmitted to the control unit on the one hand and on the other hand allow the displacement commands determined by the control unit to be transmitted to the welding unit, to the grinding means, to the workbench units, to the gripping means, and to the grippers.

The position sensors may be optical sensors or alternatively incremental sensors, either analog or digital.

The embodiments described above of implementing the invention are described merely by way of example, and modifications are possible within the scope of protection claimed.

In FIGS. 2 and 3, while the run of rail 15' is being welded, the position of the other stretch of rails 15 needs to be lower because of the size of the welding machine. However, in another embodiment, it is unnecessary for one of the stretches of rails to be lowered in order to allow the other stretch of rails to be welded, thanks to modifications in the construction of some of the components, for example the length of the arms of the grippers 5, 5', 6 or 6'.

In another type of construction, the welding equipment 16 can also be displaced in the vertical direction: thus it is unnecessary to displace the stretches of rails vertically in order to carry out welding.

Throughout the working time, the sections of the two rails on either side of the welded joint are held firmly by the four grippers of the workbench and the grippers at the ends of the vehicle in order to avoid any deformation of the rail, especially while it is being heated and while it is cooling. The space between each pair of grippers of the workbench is approximately 2.5 meters, which allows the welding and grinding equipment to work with ease. The only time when the front grippers 5, 5' (in the direction of travel of the vehicle) are loosened slightly is during the flash-forge welding so as to allow longitudinal displacement of the rail. At the end of this work, the grippers are tightened again to prevent any subsequent deformation of the rail.

We claim:

1. A welding machine for welding a stretch of new rails to replace old rails already laid on a railroad track, comprising:
   a vehicle adapted to run along said old rails of said track on two bogies, said vehicle being equipped with at least one energy generator set;
   a raised chassis carried by said vehicle between said bogies for carrying out operations on said new rails below said chassis and between said old tracks;
   at least one welding unit for welding joints in said new rails, said welding unit being moveably supported on said chassis for longitudinal, transverse and vertical movement thereon;
   grinding means for grinding joints welded in said new rails, said grinding means being moveably supported on said chassis for longitudinal, transverse and vertical movement thereon;
   two workbench units, each said workbench unit comprising a beam, each said beam respectively supporting first and second gripping means for gripping and lifting inner ends of said new rails into a working position and for supporting said new rails in said working position, each said workbench unit being moveably supported on said chassis for longitudinal, transverse and vertical movement thereon;
   a pair of grippers disposed at each end of said vehicle and operating cooperatively with said first and second gripping means to grip and lift outer ends of said new rails into said working position and to support said new rails in said working position, each said workbench unit being moveably supported on said chassis for transverse and vertical movement thereon;
   position sensors for continuously determining the positions of said welding unit, said grinding means, said workbench units, said gripping means, and said grippers relative to a set of othogonal axes, X, Y and Z, said X-axis being parallel to said track, said Y-axis being parallel to cross-ties of said track, and said Z-axis being perpendicular to an XY plane;
   a programmable automatic control unit in said vehicle for controlling operations of said machine, said control unit being capable of generating signals for controlling displacements of said welding unit, said grinding means, said work bench units, said first and second gripping means, and said grippers; and,
   transmitting means in said vehicle for transmitting positions determined by said positional sensors to said control unit and for transmitting said displacement control signals generated by said control unit to said welding unit, said grinding means, said work bench units, said first and second gripping means, and said grippers.

2. The machine as claimed in claim 1, further comprising means for cooling the head of a new rail.

3. The machine as claimed in claim 1, wherein said beams are more rigid than any type of railroad rail, wherein said first and second gripping means on said beams each further comprises a pair of grippers acting in combination with each other for gripping and precisely positioning two rails of any type of railroad rail end-to-end with each other, each said gripper comprising a movable jaw having at least three positioning stops for matching the size of any type of rail: a first stop for providing alignment of a running surface of the rail, a second stop for providing alignment of a running side of the rail, and a third stop arranged on the same side as said second stop for providing lateral alignment of a bottom surface of said rail, and wherein adjacent grippers of each said pair of grippers are spaced sufficiently apart to permit welding and grinding of said rails to occur between said grippers.

4. The machine as claim 3, in claim wherein said moveable jaw of each said gripper further comprises:
   a first lever articulated on a first horizontal, fixed pivot and operated by a first actuator for gripping, positioning, and holding a head of a rail in said gripper in the vertical direction;
   a shoe suspended from a second horizontal pivot; and,
   a second lever having a first end articulated on said first horizontal, fixed pivot, a second end articulated on said second horizontal pivot, and a free end articulated on said shoe, said second lever being operated by a second actuator in synchronism with said first actuator for gripping, positioning and holding said rail in said gripper in the transverse direction.

5. the machine as claimed in claim 1, wherein each said workbench unit has opposite ends, and further comprising a device at each of said ends for gripping and inserting an insulating joint situated along the track between two sections of rail.

6. The machine as claimed in claim 1, wherein said grinding means comprises a first grinder for grinding the bottom surface of a rail, and a second grinder for grinding the running surface and the running sides of the head of said rail.

7. The machine as claimed in claim 6, wherein said first grinder comprises:
   a pair of support arms, each articulated at one end to one of said beams of said workbench units;
   a chassis fixed to a second end of said support arms by two journals;
   means for pivoting said support arms between a standby position and a working position;
   a support mounted on said chassis;
   a pivoting frame supporting a grinding wheel and mounted on said support by a lateral pivoting bearing journelled on a lateral pivot pin;
   means for pivoting said pivoting frame laterally about said pivot pin in said XY plane, and for translating said pivoting frame in a direction parallel to said Z-axis; and,
   means for rotationally driving said grinding wheel.

8. The machine as claimed in claim 6, wherein said second grinder comprises:
   a support carriage suspended on said raised chassis for longitudinal movement relative to said chassis in a direction parallel to said X-axis;
   a first frame slidably supported in transverse guides fixed to said support carriage for transverse movement relative to said support carriage in a direction parallel to said Y-axis;
   a second frame slidably supported in vertical guides fixed to said support carriage for vertical movement relative to said first frame in a direction parallel to said Z-axis;
   clamps for clamping said second frame onto a welded rail;
   a third frame pivoted about a pivot pin mounted on said clamps and extending parallel to said X-axis for adjusting the angle of grind of said second grinder;
   a grinding head supported on said third frame by a longitudinal guide mounted on said clamps and extending parallel to said X-axis, said grinding head comprising a grinding wheel, means for rotationally driving said grinding wheel, and means for guiding the vertical movement of said grinding wheel within said grinding head;

runners for resting said longitudinal guiding means on said welded rail;

means for guiding said grinding head in the vertical direction;

means for guiding said grinding head in the longitudinal direction;

means for controlling the height of the grinding wheel within said grinding head; and, means for controlling the longitudinal movement of the grinding head.

9. The machine as claimed in claim 6, wherein said grinding means comprise a third grinder identical to said first grinder for grinding the bottom surface of a rail.

* * * * *